(12) United States Patent
Yang et al.

(10) Patent No.: US 11,971,950 B2
(45) Date of Patent: Apr. 30, 2024

(54) METHOD FOR ONSET TIME DETECTION OF ACOUSTIC EMISSION BASED ON HISTOGRAM DISTANCE

(71) Applicant: Shanghai Maritime University, Shanghai (CN)

(72) Inventors: Zhensheng Yang, Shanghai (CN); Handong Xu, Shanghai (CN); Haoda Li, Shanghai (CN); Bangping Gu, Shanghai (CN); Junliang He, Shanghai (CN)

(*) Notice: Subject to any disclaimer, the term of this patent is extended or adjusted under 35 U.S.C. 154(b) by 155 days.

(21) Appl. No.: 17/704,369

(22) Filed: Mar. 25, 2022

(65) Prior Publication Data

US 2023/0130080 A1  Apr. 27, 2023

(51) Int. Cl.
*G06F 17/18* (2006.01)
*G01N 29/36* (2006.01)
*G01N 29/44* (2006.01)

(52) U.S. Cl.
CPC ............. *G06F 17/18* (2013.01); *G01N 29/36* (2013.01); *G01N 29/449* (2013.01)

(58) Field of Classification Search
CPC ...................................................... G06F 17/18
See application file for complete search history.

(56) References Cited

PUBLICATIONS

Chen et al., "Arrival Picking of Acoustic Emission Signals Using a Hybrid Algorithm Based on AIC and Histogram Distance" IEEE Transactions On Instrumentation and Measurement, vol. 70, 2021 (Year: 2021).*
Yang et al., "Evaluating Onset Times of Acoustic Emission Signals Using Histogram Distances" IEEE Transactions On Industrial Electronics, vol. 68, No. 6, Jun. 2021 (Year: 2021).*

* cited by examiner

*Primary Examiner* — John C Kuan
(74) *Attorney, Agent, or Firm* — Lei Jiang LLC; Lei Jiang

(57) ABSTRACT

The present invention discloses a method for onset time detection of a time-domain acoustic emission signal based on histogram distance. The method comprises the following steps: acquiring an acoustic emission signal; dividing the signal into two intervals with a sliding point k as the demarcation point; obtaining the relative frequency histograms of two adjacent intervals; obtaining histogram distance of the relative frequency histograms of two adjacent intervals; moving the sliding point k to the next element to obtain two new intervals and generating new histograms of the two new intervals and calculating the histogram distance of two new intervals; searching for the point which gives the maximum value of the histogram distances, and the corresponding time to this point is regarded as the onset time.

1 Claim, 12 Drawing Sheets

METHOD FOR ONSET TIME DETECTION OF ACOUSTIC EMISSION BASED ON HISTOGRAM DISTANCE

CROSS-REFERENCE TO RELATED APPLICATIONS

The subject application claims priority of the Chinese invention application 202110895055.3 filed on 2021 Aug. 3 in China. The contents and subject matter thereof are incorporated herein by reference.

FIELD OF INVENTION

The invention relates to a method for acoustic emission signal detection and more particularly to a method for onset time detection of a time-domain acoustic emission signals based on histogram distance.

BACKGROUND ART

Identifying the onset time information in an acoustic emission signal containing several sudden changes is a challenging and critical challenge. For example, acoustic emission is the sudden redistribution of the internal stress of the material caused by the change of the internal structure of the material. Similarly, in seismology, the onset time of a seismic signal means the arrive of P and S phases.

Acoustic emission signals can characterize the operating conditions of mechanical parts such as gear wear detection, the working conditions of mechanical systems such as leakage in oil pipelines, and the state monitoring in the geological field such as the arrival time of the P and S phases in a seismic signal. As one of the main non-destructive testing methods, the employing of acoustic emission technology has been widely used in the fields of mechanical engineering, material science, and geology.

Detecting the onset time of the acoustic emission signal is one of the essential signal processing methods, and the onset of acoustic emission can characterize the change of the internal condition of an object. It is difficult to determine the onset time of the acoustic emission signal because of the background noise and the low amplitude of the signal that may appear. The Akaike information criterion (AIC) is one of the methods commonly known to the inventors that detects the point of onset time, but this method has low accuracy when processing signals with severe background noise.

Another method generally known as energy ratio (ER) is capable of detecting onset time, but this method is limited to the choosing of a reasonable time window. The detection result is dependent on the length of the time window and not suitable for low signal-to-noise ratios (SNRs) occasions.

SUMMARY OF THE INVENTION

In order to achieve more accurate detecting of onset time, the present invention discloses a method for onset time detection of a time-domain acoustic emission signals based on histogram distance, wherein the division of the time window is realized while sliding the separation point, thereby avoiding the dependence on the determining of an adequate length of the time window, and is particularly suitable for low signal-to-noise ratios occasions.

A method for onset time detection of a time-domain acoustic emission signals based on histogram distance, comprising the following steps:

(1) acquiring the time-domain signal: acquiring the time-domain signal that contains n elements with a sampling frequency in accordance with Shannon sampling theorem; that is, acquiring the time-domain signal with a sampling frequency not less than twice the highest frequency of the acquired signal;

(2) dividing the time-domain signal: dividing the acquired signal that contains n elements into two intervals by a sliding point k at each time; marking the two intervals wherein one is marked as Interval A and the other is marked as Interval B; fitting the Interval A to the interval from the 1st to kth element, and fitting the Interval B to the interval from (k+1)th to nth element;

(3) obtaining a relative frequency histogram of the Interval A and the Interval B;

(4) obtaining a histogram distance between the relative frequency histograms of the Interval A and the Interval B;

(5) determining the onset time: according to the definition of $d_B$ ($h^A$, $h^B$) regarding the sliding point k with the maximum value of the histogram distance as the onset time.

Step (3) comprises the following steps:

(3.1) defining a histogram: let y be a measurement and have one of b bins contained in an ordinal set, $Y=\{y_1, \ldots, y_i, \ldots, y_b\}$, wherein i=1, 2, . . . , b, and $y_i < y_{i+1}$; considering a signal $X=\{x_1, x_2, \ldots, x_j, \ldots x_n\}$ containing n elements, wherein j=1, 2, . . . n, and $x_1$ falling within one of the bins of Y; defining the histogram of the signal X by the relationship:

$$h^x = [h_1^x, h_2^x, \cdots, h_i^x, \cdots, h_b^x], i=1, 2, \cdots, b,$$

wherein defining $h^x$ as the histogram of the signal X, b being the total number of bins of the histogram in the signal X, and $h_i^x$ being the value of the ith bin of the histogram of the signal X and defining $h_i^x$ by the relationship:

$$h_i^x = \sum_{j=1}^{n} c_{ij}, i = 1, 2, \ldots, b,$$

and j=1, 2, . . . n, wherein $$c_{ij} = \begin{cases} 1, & x_j \in [y_i, y_{i+1}] \\ 0, & \text{otherwise} \end{cases};$$

(3.2) calculating the relative frequency histograms of two intervals A and B: defining the relative frequency histograms of said intervals A and B by the relationship, $$p_i^A = \frac{h_i^A}{k_A} \text{ and } p_i^B = \frac{h_i^B}{k_B},$$

wherein $p_i^A$ and $p_i^B$ being the probability of elements that falling within the ith bin of said histogram, $k_A$ being the total number of elements of the interval A and $k_B$ being the total number of elements of the interval B;

(4) obtaining a histogram distance between the relative frequency histograms of the Interval A and the Interval B;

Step (4) comprises the following steps:

(4.1) defining the histogram distance by the relationship:

$$d_B(h^A, h^B) = \sqrt{1 - B(h^A, h^B)} = \sqrt{1 - \sum_{i=1}^{n}\sqrt{p_i^A p_i^B}},$$

wherein $d_B(h^A, h^B)$ being the histogram distance between the histograms $h^A$ and $h^B$, $B(h^A, h^B)$ being the Bhattacharyya coefficient between the histograms $h^A$ and $h^B$ and defining $B(h^A, h^B)$ by the relationship:

$$B(h^A, h^B) = \sum_{i=1}^{n}\sqrt{p_i^A p_i^B}.$$

(4.2) moving the sliding point k: after calculating the histogram distance of the Interval A and the Interval B, moving the sliding point k to the next element to obtain an interval from the 1st to (k+1)th element and the other from (k+2)th to nth element, generating histograms of the interval from the 1st to (k+1)th element and the other from (k+2)th to nth element and calculating the histogram distance between the interval from the 1st to (k+1)th element and the other from (k+2)th to nth element; moving the sliding point k from the first element to the nth element and moving one element at each time;

The invention disclosed herein includes a method for onset time detection of a time-domain acoustic emission signals based on histogram distance. For example, in accordance with one embodiment, a method for onset time detection of a time-domain acoustic emission signals based on histogram distance comprises: acquiring time-domain signal with the sampling frequency in accordance with Shannon sampling theorem, i.e., the sampling frequency not less than twice the highest frequency of the acquired signal; dividing the signal into two intervals at each time; obtaining the relative frequency histogram of two intervals; defining and calculating the histograms of two intervals; obtaining the histogram distance of the relative frequency histogram of two intervals by calculating the histogram distance of two intervals; based on the given acoustic emission signal, execute the histogram distance calculation, and thereby derive time-series set of histogram distance; and determining the onset time at the point with the maximum histogram distance value.

In further embodiments, a method of calculating the histogram distance of time-domain acoustic emission signal comprises: dividing said acoustic emission signal into two intervals by a sliding point k at each time; marking the two intervals wherein the former interval is marked as A and the latter interval is marked as B; obtaining the histograms of the two intervals; calculating the histogram distance of the two intervals; after calculating the histogram distance of the two intervals, moving the sliding point k to the next point of said acoustic emission signal to divide the signal into two new intervals, obtaining histograms of intervals and calculating the histogram distance of two new intervals.

EMBODIMENTS

Illustrations presented herein are not meant to be actual views of any particular material, component, or system but are merely idealized representations that are employed to describe embodiments of the disclosure.

The following description provides specific details, such as the dividing process and calculation process, to provide a thorough description of embodiments of the disclosure. However, a person of ordinary skill in the art will understand that the embodiments of the disclosure may not be practiced without employing these specific details. Only those process acts and calculations necessary to understand the embodiments of the disclosure are described in detail below. A person of ordinary skill in the art will understand that some process components (e.g., acoustic emission, histogram, probability, and the like) are inherently disclosed herein and would be in accord with the disclosure.

As used herein, the term "acoustic emission" (AE) means and includes the propagation of acoustic (elastic) waves that occur when a material undergoes either reversible or irreversible changes in internal structure that are the result of stresses in the material. Acoustic emissions may result from, for example, crack formation, plastic deformation, corrosion, or change of geological shape.

Figure 1:
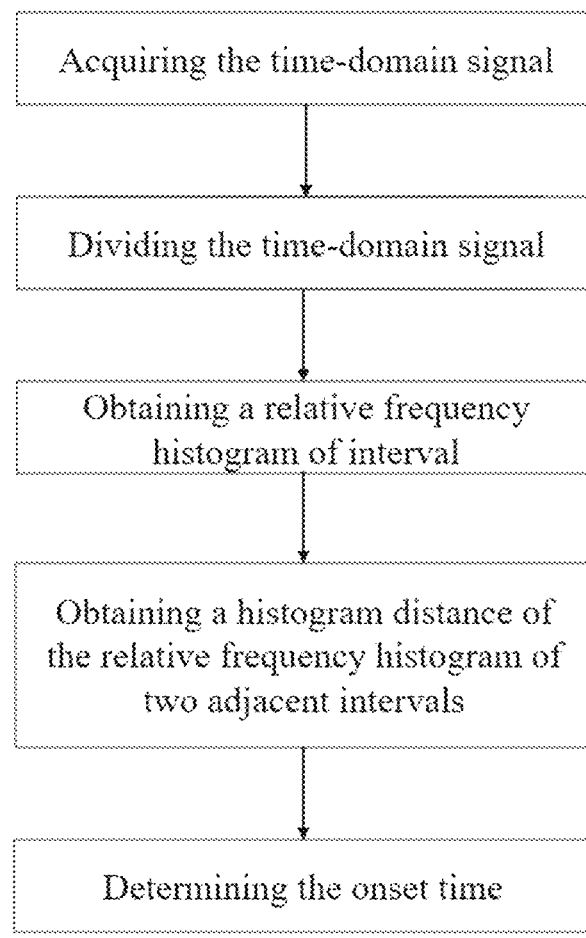
FIG. 1 depicts flow-process diagram according to an exemplary embodiment of the present invention.
Figure 2:
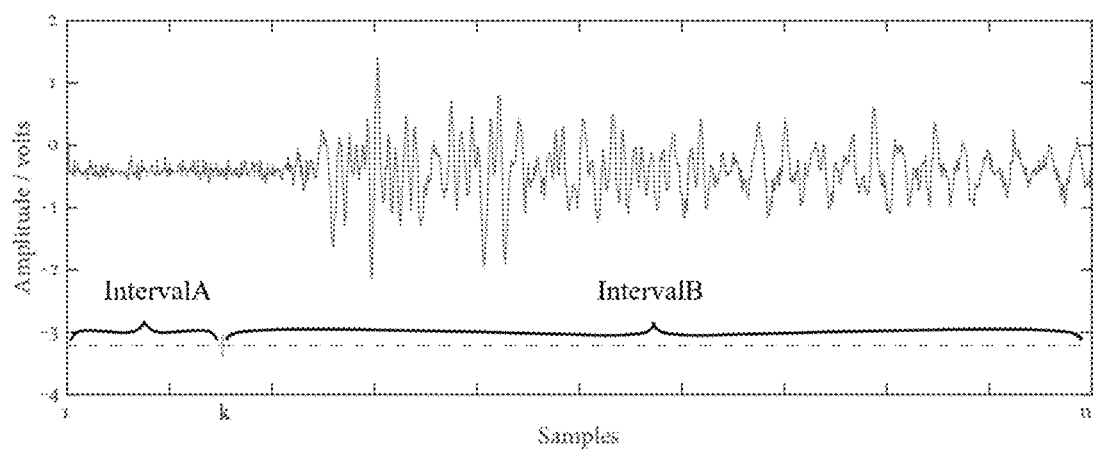
FIG. 2 depicts an illustration of the algorithm to divide a time series according to an exemplary embodiment of the present invention

FIG. 1 is a simplified and schematic representation showing detection method for the onset time of acoustic emission signal. The method may include five steps: acquiring signal 1, dividing signal 2, obtaining the relative frequency histogram of intervals 3, obtaining the histogram distance of the relative frequency histogram of two adjacent intervals 4, and determining the onset time 5.

The type of signal of acquiring signal 1 shown in FIG. 1 may include all types of digital signals with mutation components. In the signal with mutation component, the change between the background noise interval and the signal interval can be distinguished artificially, and the arriving time of this change is the onset time. The source of the signal may include occasions where one-dimensional digital signals with mutation components can be generated, such as seismic events in the geological field and acoustic emission events in the non-destructive testing field.

The present invention discloses a method for onset time detection of a time-domain acoustic emission signals based on histogram distance, which is characterized in that it comprises the following steps:

(1) acquiring the time-domain signal: acquiring the time-domain signal that contains n elements with a sampling frequency in accordance with Shannon sampling theorem; that is, acquiring the time-domain signal with a sampling frequency not less than twice the highest frequency of the acquired signal;

(2) dividing the time-domain signal: dividing the acquired signal that contains n elements into two intervals by a sliding point k at each time; marking the two intervals wherein one is marked as Interval A and the other is marked as Interval B; fitting the Interval A to the interval from the 1st to kth element, and fitting the Interval B to the interval from (k+1)th to nth element;

(3) obtaining a relative frequency histogram of the Interval A and the Interval B;

(4) obtaining a histogram distance between the relative frequency histograms of the Interval A and the Interval B;

(5) determining the onset time: according to the definition of $d_B$ ($h^A$, $h^B$) regarding the sliding point k with the maximum value of the histogram distance as the onset time.

Step (3) comprises the following steps:

(3.1) defining a histogram: let y be a measurement and have one of b bins contained in an ordinal set, $Y=\{y_1, \ldots, y_i, \ldots y_b\}$, wherein i=1, 2, . . . , b, and $y_i < y_{i+1}$; considering a signal $X=\{x_1, x_2, \ldots, x_j, \ldots x_n\}$ containing n elements, wherein j=1, 2, . . . n, and $x_j$ falling within one of the bins of Y; defining the histogram of the signal X by the relationship:

$$h^x=[h_1^x, h_2^x, \cdots, h_i^x, \cdots, h_b^x], i=1,2, \cdots, b,$$

wherein defining $h^x$ as the histogram of the signal X, b being the total number of bins of the histogram in the signal X, and $h_i^x$ being the value of the ith bin of the histogram of the signal X and defining $h_i^x$ by the relationship:

$$h_i^x = \sum_{j=1}^{n} c_{ij}, i = 1, 2, \ldots, b,$$

and j=1, 2, . . . , n, wherein $$c_{ij} = \begin{cases} 1, & x_j \in [y_i, y_{i+1}] \\ 0, & \text{otherwise} \end{cases};$$

(3.2) calculating the relative frequency histograms of two intervals A and B: defining the relative frequency histograms of said intervals A and B by the relationship, $$p_i^A = \frac{h_i^A}{k_A} \text{ and } p_i^B = \frac{h_i^B}{k_B},$$

wherein $p_i^A$ and $p_i^B$ being the probability of elements that falling within the ith bin of said histogram, $k_A$ being the total number of elements of the interval A and $k_B$ being the total number of elements of the interval B;

(4) obtaining a histogram distance between the relative frequency histograms of the Interval A and the Interval B;

Step (4) comprises the following steps:

(4.1) defining the histogram distance by the relationship:

$$d_B(h^A, h^B) = \sqrt{1 - B(h^A, h^B)} = \sqrt{1 - \sum_{i=1}^{n} \sqrt{p_i^A p_i^B}},$$

wherein $d_B(h^A, h^B)$ being the histogram distance between the histograms $h^A$ and $h^B$, $B(h^A, h^B)$ being the Bhattacharyya coefficient between the histograms $h^A$ and $h^B$ and defining $B(h^A, h^B)$ by the relationship:

$$B(h^A, h^B) = \sum_{i=1}^{n} \sqrt{p_i^A p_i^B}.$$

(4.2) moving the sliding point k: after calculating the histogram distance of the Interval A and the Interval B, moving the sliding point k to the next element to obtain an interval from the 1st to (k+1)th element and the other from (k+2)th to nth element, generating histograms of the interval from the 1st to (k+1)th element and the other from (k+2)th to nth element and calculating the histogram distance between the interval from the 1st to (k+1)th element and the other from (k+2)th to nth element; moving the sliding point k from the first element to the nth element and moving one element at each time;

The present invention is tested through two typical experiments. The experiment data are AE signals generated by the pencil-lead break (PLB) experiment and seismic P-phase data.

Figure 12:
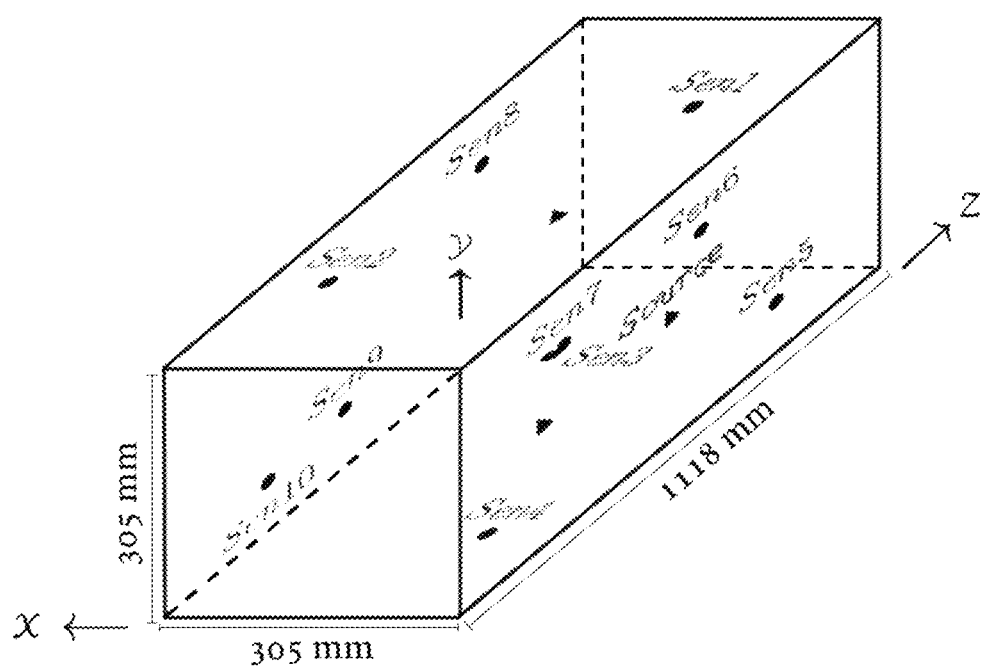
FIG. 12 depicts the sensor layout and PLB locations of the Pencil-lead break (PLB) test.

Pencil-lead break (PLB) (Hsu-nielsen source acoustic emission data on a concrete block, Data in brief, 2019), also known as Hsu-Nielsen source, is an artificial method of generating AE signals. The PLB data in this invention represent AE signals transmitted and received by conducting the PLB experiment on a concrete specimen. The PLB test consists of breaking pencil-lead in three different locations. The generated stress waves were captured by ten piezoelectric AE sensors and converted into electrical signals. The signals were digitized according to a specified sampling rate and expressed in voltage amplitudes. The data are presented for each PLB and channel. The geometry and mixture design of the concrete specimen, sensor types, sensor locations, and PLB locations are shown in FIG. 12. A concrete block with dimensions of 30.5 cm wide, 30.5 cm high, and 118 cm long is used as the test specimen. These tests consisted of breaking a 0.3-mm-diameter pencil lead approximately 3±0.5 mm from its tip by pressing it against the surface of the specimen. HB pencil leads were broken at three different points (black circles in FIG. 12) on the surface of the concrete beam. Ten piezoelectric AE sensors (black triangle in FIG. 12) were attached to the specimen. The energy released by PLB was collected by ten piezoelectric AE sensors with an operating frequency range of 200-850 kHz. The original signals were amplified using 26 dB gain. The sampling rate was 1 MHz with a threshold of 31 dB, which conforms to Shannon sampling theorem. The PLB tests generated a hundred sets of AE data.

Seismic P-phase data were gathered from the Incorporated Research Institutions for Seismology (IRIS). Data points within 5 minutes before and after the arrival of P phases are selected. Vertical component data is used as the strongest component in P phases. A total of 300 recordings with various SNRS are extracted in the dataset. The sampling rate was 100 Hz, which satisfies Shannon sampling theorem.

Methods based on Akaike information criterion (AIC) have been shown to provide accurate results for detecting the onset time. The comparison with the AIC-based method is an excellent choice to evaluate the applicability of the present inventions. AIC assumes the time series can be divided into locally stationary segments, each segment is modeled as an autoregressive process, and that intervals before and after the onset time can be split into two different stationary time series. For a fixed order auto-regressive process, the corresponding time to the point at which the AIC is minimized is the onset time. The AIC used here is defined by the relationship (Strategies for reliable automatic onset time picking of acoustic emissions and of ultrasound signals in concrete, Ultrasonics, 2005):

$$AIC(t_w) = t_w \cdot \log(\text{var}(R_w(t_w,1))) + (T_w - t_w - 1) \cdot \log(\text{var}(R_w(1+t_w, T_w))),$$

where the index w of $R_w$ denotes that not the whole time series is taken but only the chosen window containing the onset, and $T_w$ is the last sample of the curate time series, $t_w$ ranges through all samples of $R_w$ and var denotes the variance function. The term $R_w(t_w, 1)$ means that the variance function is only calculated from the current value of $t_w$ while $R_w(1+t_w, T_w)$ means that all samples ranging from $1+t_w$ to $T_w$ are taken.

The invention discloses a method for onset time detection of a time-domain acoustic emission signals based on histogram distance which determines the onset time accurately. The experimental verification is as follows:

(1) Pencil-lead break test: pencil-lead break (PLB) is an artificial method of generating AE signals and is commonly used for calibration and simulation. These tests consisted of breaking a 0.3-mm-diameter pencil lead approximately 3±0.5 mm from its tip by pressing it against the surface of the specimen. HB pencil leads were broken at three different points on the surface of the concrete beam. The energy released by PLB was collected by ten piezoelectric AE sensors with an operating frequency range of 200-850 kHz. The original signals were amplified using 26 dB gain. The sampling rate was 1 MHz with a threshold of 31 dB, which satisfies Shannon sampling theorem. The PLB tests generated a hundred sets of AE data. Through the above steps, the results obtained are compared with the onset time that are detected manually. The manual detection results, defined as those determined by the experienced analyst in daily analysis, have been empirically assumed as being the correct ones.

Figure 3:
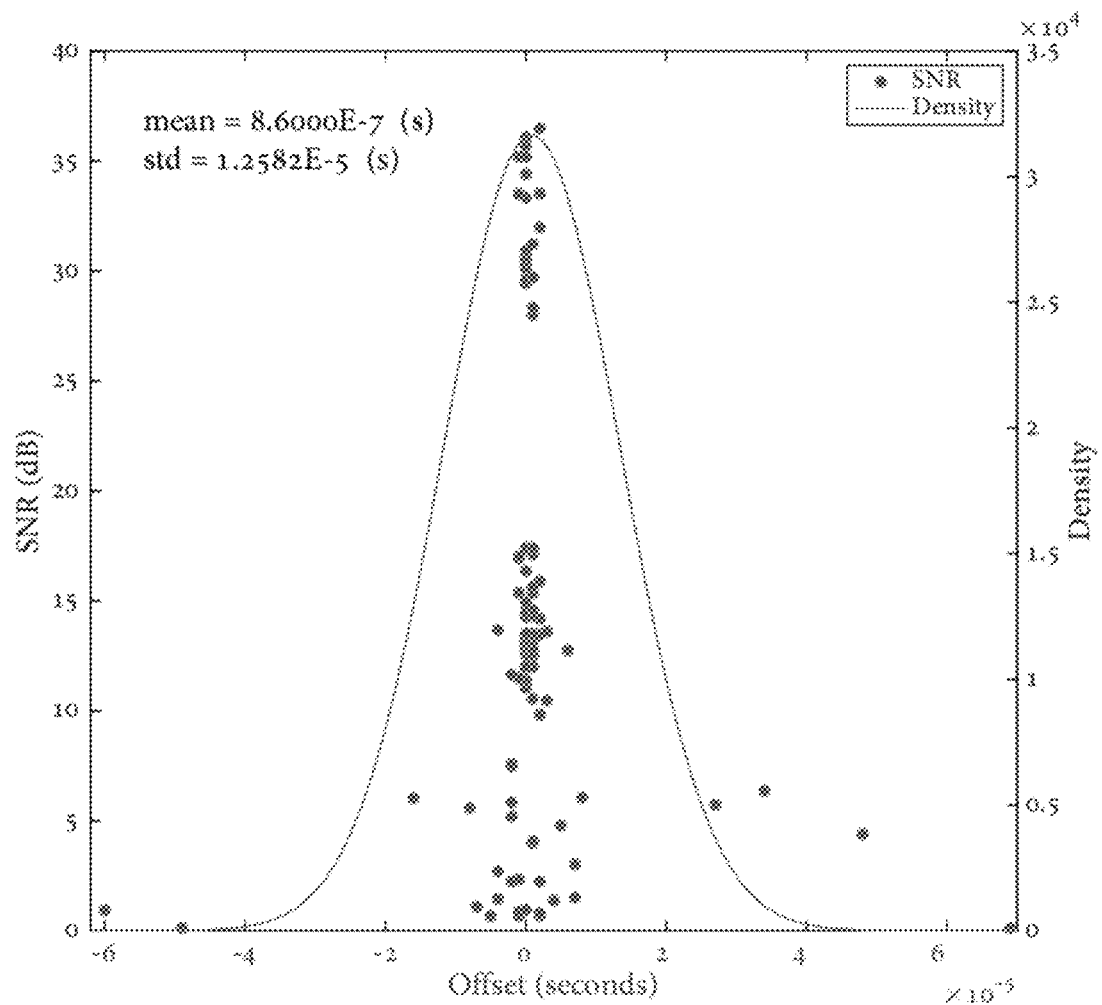
FIG. 3 depicts the offset of PLB detection and corresponding distribution according to an exemplary embodiment of the present invention.

FIG. 3 depicts the offset of PLB detection between the detection results of the present invention and the manual results and its corresponding distribution. The series of points represent the offset of onset time with different SNR. The curve represents the density curve which provides an estimate of the mean for the corresponding distribution. The offset is the difference from the manual detection result. The mean is the average size of the offset dataset, and the standard deviation (STD) is used to measure the dispersion of the offset data points. Smaller means and STDs mean that the results are more accurate. The mean of the offset calculated by the present invention is 8.60e-7 seconds, and the STD is 1.26e-5 seconds. It can be seen that the results obtained by using the present invention are accurate. SNRs is regarded as a measure to quantify the detection accuracy. The SNRs of these time series were calculated using the ratio of amplitudes between 10 ms before and after the onset time. The SNRs of these 100 PLB tests vary from 0.01 dB to 36 dB. For SNRs>10 dB, most offset values are concentrated around the average value. The offset is dispersed when SNRs are lower than 10 dB. The percentage for the time differences that are less than 20 µs is 94%.

Figure 7:
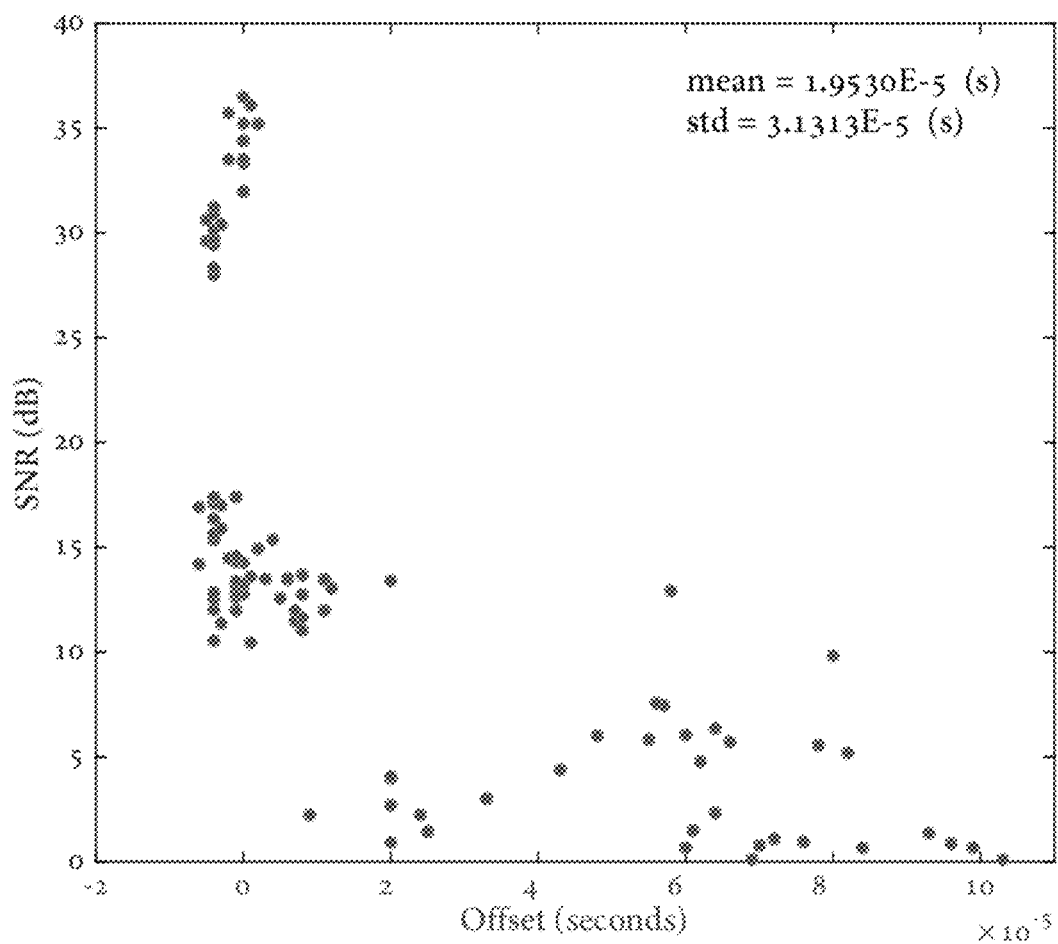
FIG. 7 depicts the offset of PLB detection according to the conventional method based on AIC.

Methods based on Akaike information criterion (AIC) are conventional methods for detecting onset time of signals. The present invention is compared with the AIC-based methods. FIG. 7 depicts the offset of PLB detection of the AIC-based method. The series of points represent the AIC offset of onset time with different SNR. For SNRs>25 dB, the AIC method produces better results than results at 10<SNRs<20 dB. In contrast, the results are dispersed when SNRs are lower than 10 dB. Apart from this, clearly, the distributions of the offset in FIG. 7 are much narrower than those in FIG. 3. The mean of AIC offset is 1.95e-5 seconds, and the STD is 3.13e-5 seconds. Both mean and STD of the offset measured by the AIC method is higher than the present invention. The present invention is more accurate than the AIC method.

Figure 4:
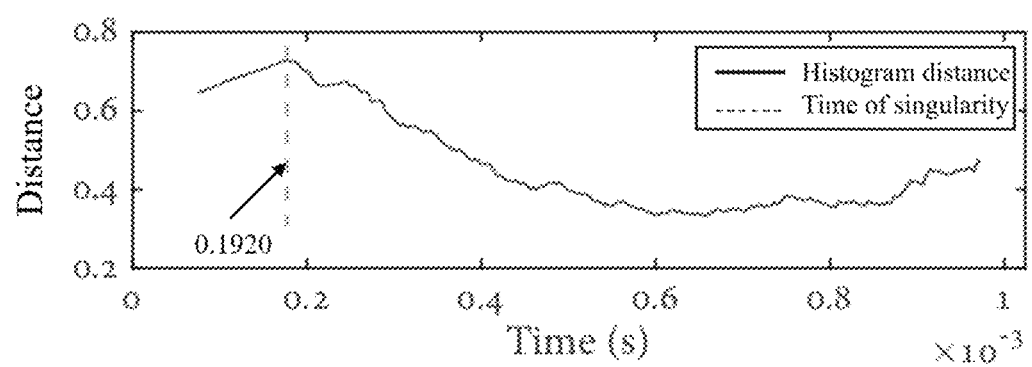
FIG. 4 depicts the PLB detection results according to an exemplary embodiment of the present invention.
Figure 8:
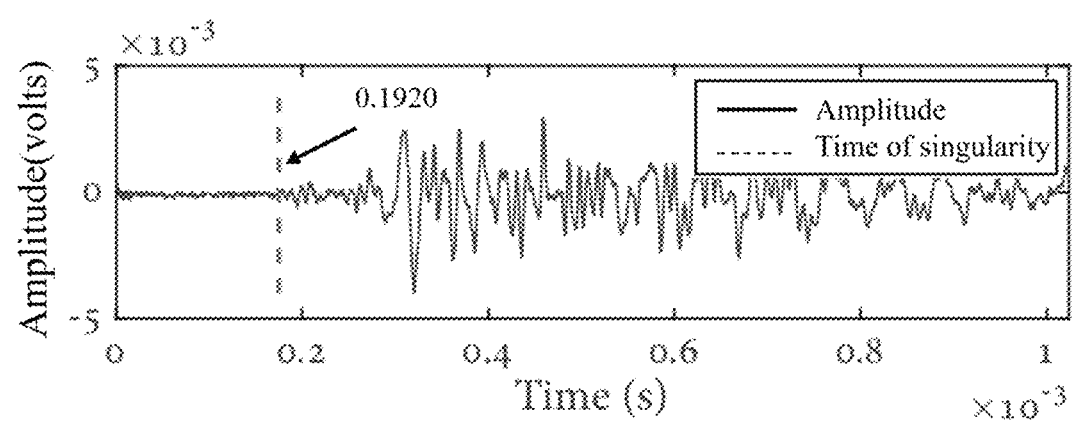
FIG. 8 depicts the PLC manual detection result according to the conventional method.
Figure 9:
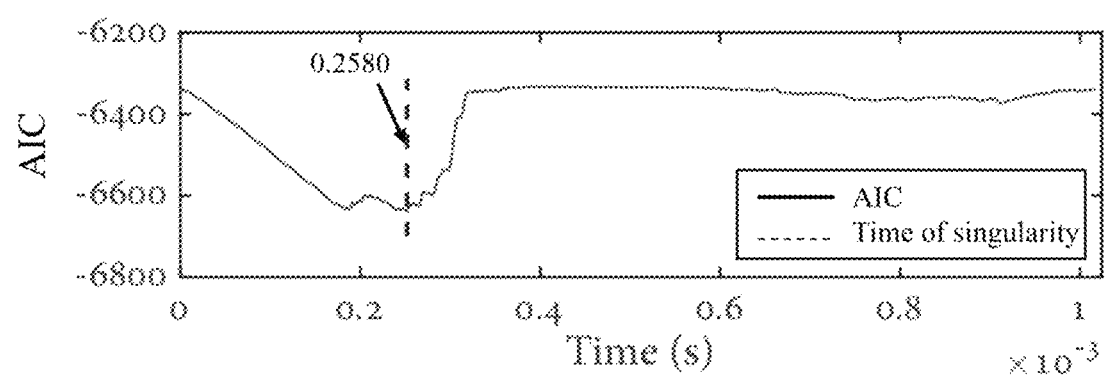
FIG. 9 depicts the PLB detection results according to the conventional method based on AIC.

FIG. 8 depicts the manual detection results of the PLB tests. The line represents the amplitude of the AE signal. The point is the intersection of dotted line and line, indicating the arriving point. The dotted line represents the onset time. The onset time of signal is 0.1920 s. FIG. 4 depicts the PLB detection results of the present invention. The line represents the histogram distance calculated by the present invention. The point is the intersection of dotted line and line, indicating the signal arriving point. The dotted line represents the onset time calculated by the present invention. The onset time of signal is 0.1920 s, which is the same as the manual result. FIG. 9 depicts the detection results of AIC method. The line represents the AIC value calculated by the AIC method. The point is the intersection of dotted line and line, indicating the signal arriving point. The dotted line represents the onset time calculated by the AIC method. The onset time of signal is 0.2580 s. It is noticed that the AIC value at the point of manual result clearly drops. After that, the AIC values start to fluctuate. The minimum value is obtained at the point where the signal strength is significantly higher than the point of the manual result. As a consequence, the result generated from the AIC method is delayed. In contrast, the present invention can reflect the onset time accurately. The onset time is given at the point where the value of histogram distance is maximized.

(2) Seismic P-phase detection test: The digital seismic waveform data were gathered from the Incorporated Research Institutions for Seismology (IRIS). Data points within 5 minutes before and after the arrival of P phases are selected. Vertical component data is used as the strongest component in P phases. A total of 300 recordings are extracted from the dataset. The sampling rate was 100 Hz, which satisfies the Shannon sampling theorem. This dataset has a diversity of waveform characteristics. Through the above five steps, the results obtained are compared with the onset time detected manually.

Figure 5:
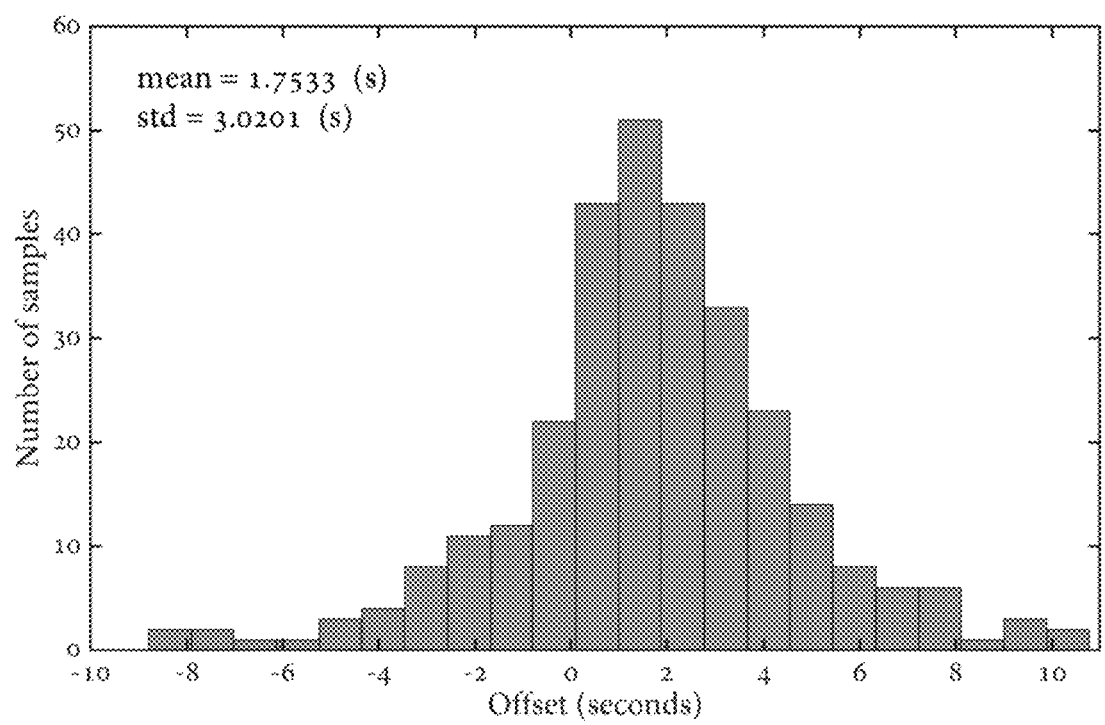
FIG. 5 depicts the offset of P-phase detection according to an exemplary embodiment of the present invention.
Figure 10:
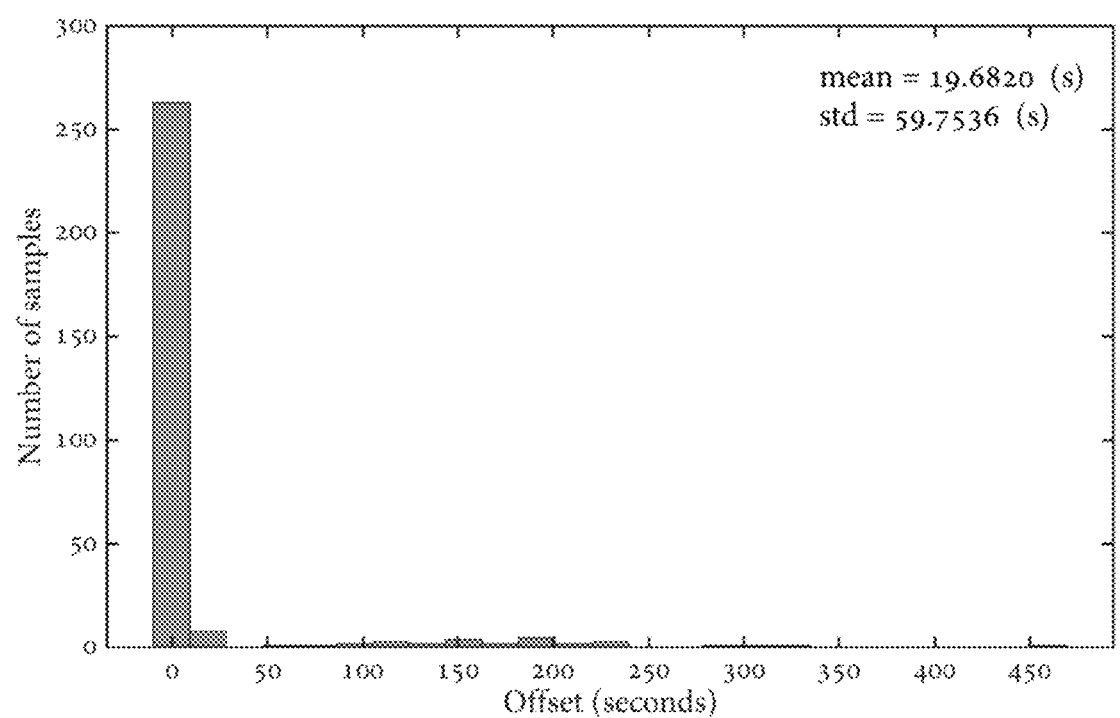
FIG. 10 depicts the offset of P-phase detection according to the conventional method based on AIC.

FIG. 5 depicts the offset of P-phase detection of the present invention. The histograms represent the number of samples with different offset. The mean of the offsets calculated by the present invention is 1.75 seconds, and the STD is 3.02 seconds. The numbers of offset that fall within ±2 s occupy 45% of the dataset. FIG. 10 depicts the offset of P-phase detection of the AIC-based method. The histograms represent the number of samples with different AIC offset. The mean of the offset calculated by the present invention is 19.68 seconds, and the STD is 59.75 seconds. In contrast, as for the AIC method, the percentage of the numbers of offset that fall within the same range is 39.7%. It can be seen from the comparison results of means and STDs that the present invention is more accurate than the AIC method.

Figure 6:
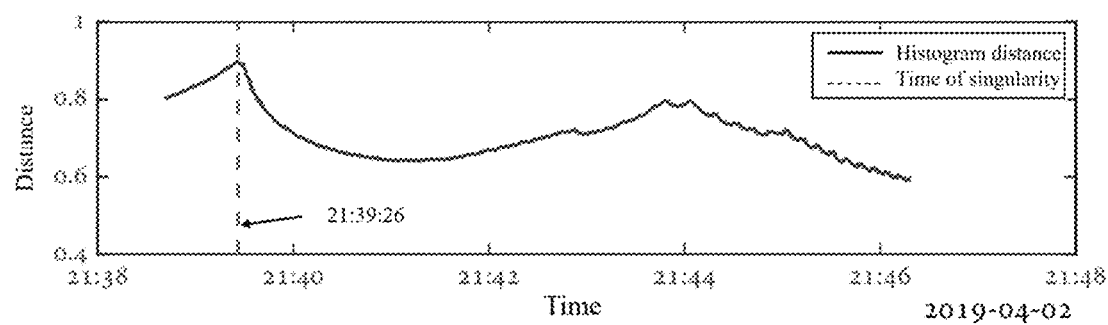
FIG. 6 depicts the P-phase detection results according to an exemplary embodiment of the present invention.
Figure 11:
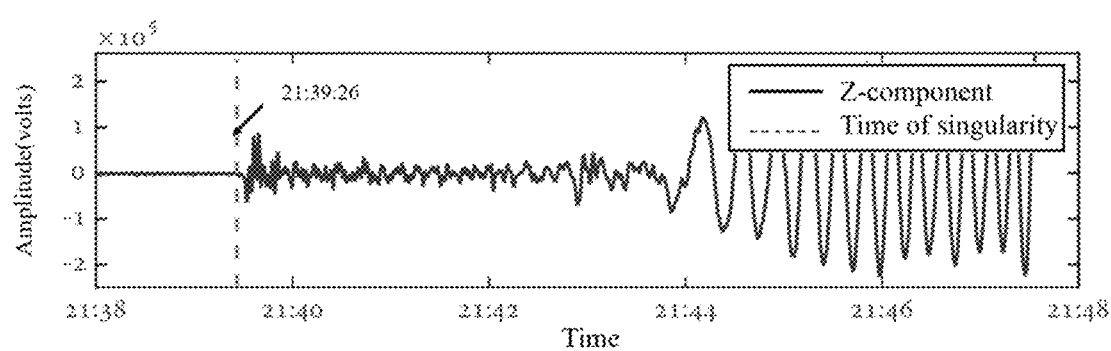
FIG. 11 depicts the P-phase manual detection results according to the conventional method.

FIG. 11 depicts the ground-truth detection results of the P-phase. The line represents the amplitude of the z-component. The point is the intersection of dotted line and line, indicating the signal arriving point. The dotted line represents the manual onset time. The onset time of the signal is 21:39:26. FIG. 6 depicts the P-phase detection results of the present invention. The line represents the histogram distance calculated by the present invention. The point is the intersection of dotted line and line, indicating the signal arriving point. The dotted line represents the onset time calculated by the present invention. The onset time of signal is 21:39:26, which is the same as the manual result. For different waveform characteristics, the present invention detects the onset time of the signal. The first peaks accurately align with the ground-truth detection results.

All seismic data were downloaded through the IRIS Wilber 3 system (https://ds.iris.edu/wilber3/) or IRIS Web Services (https://service.iris.edu/), including the following seismic networks: (1) the II (GSN; Scripps Institution of Oceanography, 1986); (2) the IU (GSN; Albuquerque, 1988); (3) the CU (USGS, Albuquerque, 2006).

In the above two verification experiments, PLB is the most commonly used acoustic emission related detection and verification approach, and acoustic emission technology is widely used in the field of nondestructive testing. Seismic P-phase detection is the basis of seismic signal post-processing and source location, which is of great significance in the field of geology. The present invention has experienced many verification experiments and has high reliability. Compared with the conventional method, the present invention shows the characteristics of high accuracy.

The present invention has experienced verification with various SNR signals, especially for the identification of low SNR signals. In summary, the present invention has high practicability and is suitable for process monitoring, seismology and other fields.

While the present invention has been particularly shown and described with reference to exemplary embodiments thereof, it is evident that many alternatives, modifications and variations will be apparent to those skilled in the art. It will be understood by those skilled in the art that various changes in form and details may be made therein without departing from the spirit and scope of the invention as defined by the appended claims.

In addition, since the present invention can be embodied in various forms, and should not be construed as being limited to the embodiments set forth herein. Rather, these embodiments are provided so that this disclosure will be thorough and complete and will fully convey the concept of the invention to those skilled in the art, and the present disclosure will only be defined by the appended claims.

The invention claimed is:

1. A method for onset time detection of a time-domain acoustic emission signal of a concrete beam based on histogram distance, comprising the following steps:
(1) acquiring the time domain acoustic emission signal: breaking a pencil lead on the concrete beam by pressing the pencil lead against a surface of the concrete beam; attaching a piezoelectric acoustic emission sensor to the concrete beam, and collecting energy released by the pencil lead from the piezoelectric acoustic emission sensor as the acoustic emission signal containing n elements, n being an integer greater than 2;
(2) dividing the time-domain acoustic emission signal: dividing the acquired acoustic emission signal that contains n elements into two intervals by a sliding point k at each iteration in a sliding operation, the sliding point k representing the kth element in the n elements; marking the two intervals wherein one is marked as Interval A and the other is marked as Interval B; fitting the Interval A to the interval from the 1st to kth element, and fitting the Interval B to the interval from (k+1)th to nth element;
(3) obtaining a relative frequency histogram of the Interval A and the Interval B, respectively:
  (3.1) defining a histogram: let y be a measurement and have one of b bins contained in an ordinal set, $Y=\{y_1, \ldots, y_i, \ldots, y_b\}$, wherein $i=1, 2, \ldots, b$, and $y_i < y_{i+1}$;
  considering an acoustic emission signal generated from the concrete beam $X=\{x_1, x_2, \ldots, x_j, \ldots x_n\}$ containing n elements, wherein $j=1, 2, \ldots n$, and $x_j$ falling within one of the bins of Y; defining the histogram of the signal X by the relationship:

$$h^x = [h_1^x, h_2^x, \cdots, h_i^x, \cdots, h_b^x], i=1,2,\cdots,b,$$

wherein defining $h^x$ as the histogram of the signal X, b being a total number of bins of the histogram in the signal X, and $h_i^x$ being a value of the ith bin of the histogram of the signal X and defining $h_i^x$ by the relationship:

$$h_i^x = \sum_{j=1}^{n} c_{ij}, i = 1, 2, \ldots, b,$$

and $j=1, 2, \ldots, n$, wherein $$c_{ij} = \begin{cases} 1, & x_j \in [y_i, y_{i+1}] \\ 0, & \text{otherwise} \end{cases};$$

and
  (3.2) calculating the relative frequency histograms of two intervals A and B: defining the relative frequency histograms of said intervals A and B by the relationship, $$p_i^A = \frac{h_i^A}{k_A} \text{ and } p_i^B = \frac{h_i^B}{k_B},$$

wherein $p_i^A$ and $p_i^B$ being a probability of elements that falling within the ith bin of said histogram in the intervals A and B respectively, $h_i^A$ being a value of the ith bin of the histogram of the intervals A, $h_i^B$ being a value of the ith bin of the histogram of the interval B, and $k_A$ being a total number of elements of the interval A and $k_B$ being a total number of elements of the interval B;
(4) obtaining a histogram distance between the relative frequency histograms of the Interval A and the Interval B:

(4.1) defining the histogram distance by the relationship:

$$d_B(h^A, h^B) = \sqrt{1 - B(h^A, h^B)} = \sqrt{1 - \sum_{i=1}^{n} \sqrt{p_i^A p_i^B}},$$

wherein $d_B(h^A, h^B)$ being the histogram distance between the histograms $h^A$ and $h^B$, $B(h^A, h^B)$ being the Bhattacharyya coefficient between the histograms $h^A$ and $h^B$ and defining $B(h^A, h^B)$ by the relationship:

$$B(h^A, h^B) = \sum_{i=1}^{n} \sqrt{p_i^A p_i^B};$$

and (4.2) moving the sliding point k: after calculating the histogram distance of the Interval A and the Interval B, moving the sliding point k to the next element to obtain an interval from the 1st to (k+1)th element and the other from (k+2)th to nth element, generating histograms of the interval from the 1st to (k+1)th element and the other from (k+2)th to nth element and calculating the histogram distance between the interval from the 1st to (k+1)th element and the other from (k+2)th to nth element; moving the sliding point k from the first element to the nth element and moving one element; at each iteration in the sliding operation; and (5) determining the onset time: according to the definition of $d_B(h^A, h^B)$, regarding the sliding point k with a maximum value of the histogram distance as the onset time of an acoustic emission signal.

* * * * *